United States Patent [19]

Kozaki

[11] Patent Number: 5,477,404
[45] Date of Patent: Dec. 19, 1995

[54] MAGNETIC DISK APPARATUS HAVING A CONTACT ANGLE ADJUSTMENT MECHANISM

[75] Inventor: Masahiro Kozaki, Kawasaki, Japan

[73] Assignee: Fujitsu Limited, Kawasaki, Japan

[21] Appl. No.: 298,358

[22] Filed: Aug. 30, 1994

Related U.S. Application Data

[63] Continuation of Ser. No. 7,139, Jan. 21, 1993, abandoned.

[30] Foreign Application Priority Data

Jan. 22, 1992 [JP] Japan ..................... 4-008956

[51] Int. Cl.$^6$ ............................... G11B 5/56; G11B 5/48
[52] U.S. Cl. ..................... 360/109; 360/130.34; 360/104
[58] Field of Search ..................... 360/109, 104, 360/105, 130.34, 130.3, 106

[56] References Cited

U.S. PATENT DOCUMENTS

| | | | |
|---|---|---|---|
| 3,879,757 | 4/1975 | Elliott et al. | 360/130.34 |
| 3,939,495 | 2/1976 | Nagi et al. | 360/109 |
| 3,975,774 | 8/1976 | Helbers | 360/130.34 |
| 4,807,070 | 2/1989 | Isozaki et al. | 360/104 |
| 4,901,176 | 2/1990 | Kuzuhara | 360/104 |
| 5,012,369 | 4/1991 | Owe et al. | 360/104 |
| 5,041,932 | 8/1991 | Hamilton | 360/104 |
| 5,060,099 | 10/1991 | Yaeger et al. | 360/105 |
| 5,255,135 | 10/1993 | Itoh et al. | 360/109 |

FOREIGN PATENT DOCUMENTS

| | | |
|---|---|---|
| 0098921 | 1/1984 | European Pat. Off. ............ 360/130.3 |
| 55-73924 | 6/1980 | Japan . |
| 58-77014 | 5/1983 | Japan . |
| 59-99254 | 7/1984 | Japan . |
| 60-22783 | 2/1985 | Japan . |
| 63-188856 | 8/1988 | Japan . |
| 1-109568 | 4/1989 | Japan . |
| 1-119954 | 5/1989 | Japan . |
| 1-292683 | 11/1989 | Japan . |

OTHER PUBLICATIONS

"A contact-type Vertical Magnetization Head Developed, Provides a Maximum Surface Recording Density of 2 GBIT/ (Inch)$^2$" Nikkei Electronics, Nov. 9, 1992, p. 62, No. 567.

*Primary Examiner*—John H. Wolff
*Assistant Examiner*—Craig A. Renner
*Attorney, Agent, or Firm*—Greer, Burns, Crain, Ltd.

[57] ABSTRACT

A magnetic information storage device comprises a rotatable rigid magnetic disk, a driving unit for revolving the magnetic disk, a swing arm for scanning a surface of the magnetic disk generally in a radial direction, an actuator for actuating the swing arm, an elongated magnetic head fixed at a free end of the swing arm for scanning the surface of the magnetic disk generally in the radial direction in response to a swinging motion of the arm while maintaining a contact engagement with the magnetic disk, and an adjustment mechanism provided on the arm for adjusting a contact angle between the elongated magnetic head and the surface of the magnetic disk such that a reproduced signal is obtained with a maximized signal amplitude.

9 Claims, 10 Drawing Sheets

MAGNETIC DISK APPARATUS HAVING A CONTACT ANGLE ADJUSTMENT MECHANISM

RELATED APPLICATION

This is a continuation of application Ser. No. 08/007,139, filed on Jan. 21, 1993, now abandoned.

BACKGROUND OF THE INVENTION

The present invention generally relates to magnetic information storage devices and more particularly to a magnetic information storage device for recording and reproducing an information signal on and from a rigid magnetic disk that is revolved at a high speed in a hermetically sealed environment.

In the magnetic information storage devices of the so-called hard disk, a rigid magnetic disk revolving at a high speed such as several thousand r.p.m. is used for a recording medium, and recording and reproduction of information signals are achieved on and from the magnetic disk by means of a magnetic head that scans the surface of the magnetic disk without establishing contact therewith. The conventional hard disk device having a construction as such generally provides a very high access speed in the order of ten milliseconds or less and is used extensively as the auxiliary storage devices of computers and microprocessors. On the other hand, the conventional hard disk device occupies a considerable space mainly due to the size of the floating magnetic head and the space in which the magnetic head moves, and there exists a substantial difficulty in the reduction in the size of the device. Further, such a conventional hard disk device that uses a floating magnetic head is vulnerable to external shock.

On the other hand, there is proposed a new type of hard disk device that uses a very small, needle-like magnetic head that contacts with the surface of the revolving magnetic disk as shown in FIG. 1.

Referring to FIG. 1, the hard disk device is constructed on a base body 10 that defines a hermetically sealed space therein together with another base body part not illustrated. In the hermetically sealed space formed as such, there is provided a chassis 11 on which a shaft 12 is fixed. Further, the chassis 11 carries thereon a motor not illustrated in FIG. 1 and the motor drives a stage 13a such that the stage 13a revolves about the shaft 12 at a high speed typically in the order of several thousand r.p.m.

The stage 13a thus driven by the motor carries thereon one or more magnetic disks 13 wherein the magnetic disk 13 is formed of a rigid material such as aluminum and carries a magnetic coating. Further, a magnetic head assembly 14 is provided on the base body 10, wherein the magnetic head assembly 14 includes a shaft 16 that is fixed on the base body 10, and an arm 15 is mounted on the shaft 16 such that the arm 15 swings freely about the shaft 16. The arm 15 carries at a free end thereof a needle-like magnetic head member 17 that is urged to establish a continuous contact to the surface of the disk 13, typically with an urging force of about 0.5 mN, corresponding to a magnetic head of about 1 mg in mass. Further, the arm 15 is driven by an electromagnetic actuator 18 provided on the base body 10, and the needle-like magnetic head member 17 at the free end of the arm 15 scans the surface of the magnetic disk 13 in a radial direction thereof in response to the swinging motion of the arm 15.

It should be noted that the magnetic head member 17 carries a magnetic head at a tip end thereof, and the information signal picked up at the magnetic head part is transferred to a terminal pad 20 on the base body 10 via a flexible cable 19. Further, the flexible cable is used for supplying an electric power for actuating the arm 15. When recording information, on the other hand, the information signal is supplied to the magnetic head part from the terminal pad 20 via the flexible cable 19 for causing a magnetization of the magnetic disk 13 in response to the information signal.

FIG. 2 shows the arm 15 and the magnetic head member 17 attached thereto in more detail, wherein the arm 15 is formed of a resilient material such as aluminum and the magnetic head member 17 is attached to the arm 15 by an adhesive. Further, it will be noted that the arm 15 is formed with a U-shaped part in correspondence to a part that is mounted on the magnetic head assembly 14.

FIG. 3 shows the arm 15 and the head member 17 of FIG. 2 in the assembled state, wherein the arm 15 is mounted on a rotary sleeve 14a that in turn is fitted upon the shaft 16 shown in FIG. 1 such that the sleeve 14a can rotate freely about the shaft 16. The sleeve 14a carries a frame 14b that in turn carries a coil thereon, and the coil on the frame 14b is driven, with respect to a stator in the electromagnetic actuator 18, in response to a drive current that is supplied via the flexible flat cable 19. Thereby, the arm 15 experiences a swinging motion in response to the energization of the actuator 18.

FIG. 4 shows the cross sectional view of the hard disk device of FIG. 1, wherein only essential part will be described.

Referring to FIG. 4, it will be noted that the base body 10 carries a motor M such that the motor M surrounds the shaft 12, and a rotor 13a is provided to surround the motor M. There, the rotor 13a is held rotatable about the shaft 12 by a bearing 13b and is driven upon energization of the motor M. The magnetic disk 13 is fixed upon the rotor 13a and revolves unitarily with the rotor 13a about the shaft 12. In the illustrated example, two magnetic disks are provided parallel about the common shaft 12. Further, it will be understood that the sleeve 14a is held rotatable about the shaft 16 by a bearing 14c. The electromagnetic actuator 18 includes stator magnets that are disposed above and below the frame 14b.

In FIG. 4, it is important to note that the needle-like magnetic head member 17 establishes a contact engagement with the surface of the magnetic disk 13. As already mentioned, the arm 15 resiliently urges the head member 17 upon the magnetic disk 13, and the recording and reproduction of information signals is achieved in the state that the head member 17 maintains the contact engagement with the surface of the revolving magnetic disk 13. By using the needle-like magnetic head member 17, one can reduce the space occupied by the magnetic head in the hard disk device, and the number of the magnetic disks that are mounted on the common shaft can be increased. Alternatively, one can reduce the height of the hard disk device. The components of the disk drive are covered by a cover lid 21.

FIG. 5 shows the overall view of the magnetic head member 17 in a slightly enlarged scale.

Referring to FIG. 5, it will be noted that the magnetic head member 17 includes a resilient main body 17a having a first end 17b in which a magnetic head is formed and a second, opposite end 17c that is adapted for mounting on the arm 15. The magnetic head of FIG. 5 is described in the U.S. Pat. No.

5,041,932 to Hamilton, which is incorporated herein as reference.

FIG. 6 shows the magnetic head that is formed in the end part 17b of the magnetic head member 17 in an enlarged cross section.

Referring to FIG. 6, the magnetic head member 17 is defined with a slide surface 17h between an end surface 17j and a bottom surface 17i for contact engagement with the magnetic disk 13, and a magnetic yoke 17d is embedded in the magnetic head member 17 together with a coil 17e. The lead coil 17e is connected to a lead wire 17g. Further, the magnetic yoke 17d forms a gap 17f in correspondence to the slide surface 17h for creating a magnetic field that penetrates into the magnetic disk 13.

FIGS. 7(A) and 7(B) show the state of engagement of the magnetic head member 17 and the magnetic disk 13, wherein FIG. 7(A) shows the normal contacting state while FIG. 7(B) shows the abnormal state. In the state of FIG. 7(A), the angle of the magnetic head member 17 with respect to the magnetic disk 13 is optimized such .that the slide surface 17h establishes the desired contact engagement with the magnetic disk 13 with an optimized pressure. On the other hand, when the angle is inappropriate as shown in FIG. 7(B), the slide surface 17h fails to contact with the disk 13 and the recording and reproduction characteristics of information signals become deteriorated substantially. As the magnetic head member 17 is mounted on the arm 15 by an adhesive or laser welding, the adjustment of the contact angle of the head member 17 is generally impossible in the magnetic head assembly 14 of the conventional type. Thereby, the assembling process has to be conducted extremely precisely and the yield of the product deteriorates accordingly.

SUMMARY OF THE INVENTION

Accordingly, it is a general object of the present invention to provide a novel and useful magnetic storage device, wherein the foregoing problems are eliminated.

Another and more specific object of the present invention is to provide a magnetic storage device of the type so-called hard disk that uses a needle-like magnetic head in contact with a rotary magnetic disk, wherein the contact angle of the magnetic head with respect to the magnetic disk is optimized.

Another object of the present invention is to provide a magnetic storage device of the type so-called hard disk that uses a needle-like magnetic head in contact with a rotary magnetic disk, wherein the magnetic storage device is equipped with a mechanism for adjusting the contact angle of the magnetic head with respect to the magnetic disk.

Another object of the present invention is to provide a magnetic information storage device, comprising: a base body; at least one magnetic disk held rotatably on said base body, said magnetic disk being formed of a rigid material and carrying thereon a magnetic coating; driving means for driving said magnetic disk to cause a revolving motion thereof; swing arm means held rotatably on said base body such that said arm means scans a surface of said magnetic disk generally in a radial direction of said magnetic disk, in response to a swinging motion of said arm means; actuation means for actuating said swing arm means for causing said swinging motion in said swing arm means; magnetic head means fixed at a free end of said swing arm means for scanning said surface of said magnetic disk generally in the radial direction in response to said swinging motion of said swing arm means, said magnetic head means having an elongated form extending between a first end and a second end at which said magnetic head means is connected to said swing arm means, said magnetic head means establishing a contact engagement with said surface of said magnetic disk, said magnetic head means carrying an electromagnetic conversion element in correspondence to said first end for establishing an electromagnetic interaction with said magnetic disk; and adjustment means provided on said swing arm means for adjusting a contact angle between said elongating magnetic head means and said surface of said magnetic disk such that a reproduced signal is obtained at said electromagnetic conversion element in response to a magnetic recording on said magnetic disk, with a maximized signal amplitude. According to the present invention, one can optimize the contact angle between the elongated magnetic head means and the disk surface such that the intensity of the information signal recorded and reproduced on and from the magnetic disk is maximized, even after the magnetic head means is fixed upon the arm means. Thereby, the yield of the product is substantially improved.

Other objects and further features of the present invention will become apparent from the following detailed description when read in conjunction with the attached drawings.

DETAILED DESCRIPTION OF THE PREFERRED EMBODIMENT

Figure 8A:
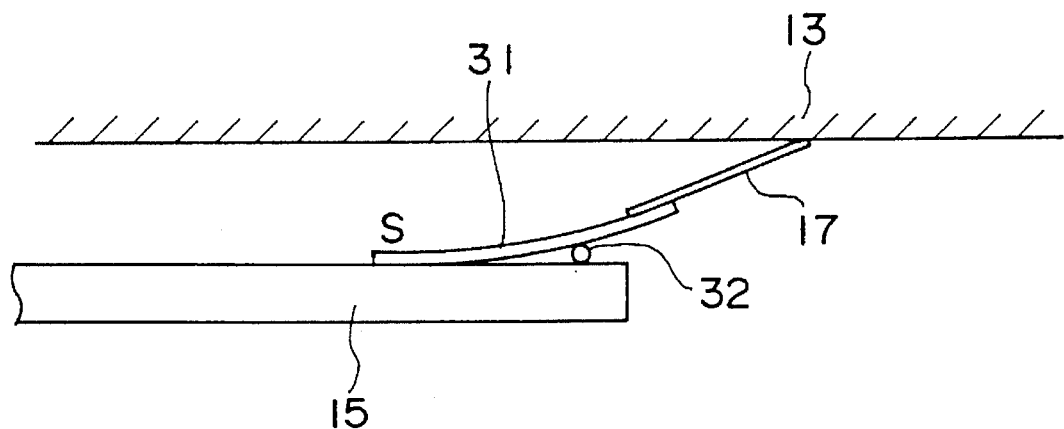
FIGS. 8(A) and 8(B) are diagrams showing the principle of the present invention respectively in a side view and a plan view.
Figure 8B:
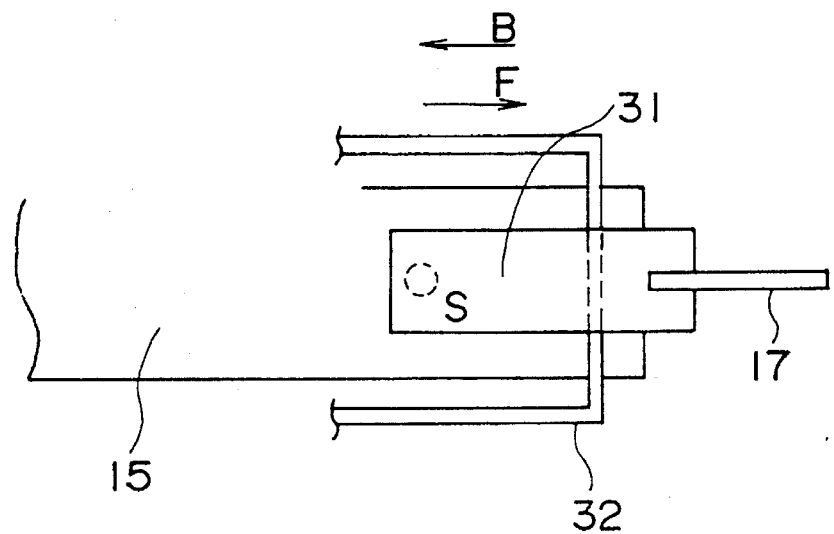

FIGS. 8(A) and 8(B) show the principle of the present invention. In the description hereinafter, those parts that have been described already are designated by the same reference numerals and the description thereof will be omitted.

Referring to the drawings, it will be noted that a leaf spring 31 is provided on the free end of the arm 15, and the elongated magnetic head member 17 is attached to a free end of the leaf spring 31 by an adhesive or laser welding at a spot region S. Further, a U-shaped wire member 32 is provided between the arm 15 and the leaf spring 31 in a manner movable in the elongating direction of the arm 15 for adjusting the bending angle of the leaf spring 31. When the wire member 32 is displaced in the forward direction toward the tip end of the arm 15 as indicated by an arrow F in FIG. 8(B), the bending angle of the leaf spring 31 decreases, while when the wire member 32 is displaced in the backward direction as indicated by an arrow B, the bending angle increases. With the adjustment of the bending angle of the leaf spring 31 thus achieved, the contact angle of the elongated magnetic head member 17 to the magnetic disk 13 changes, and one can optimize the contact angle such that the recording and reproduction of the information signals can be achieved with a maximum S/N ratio.

Figure 9:
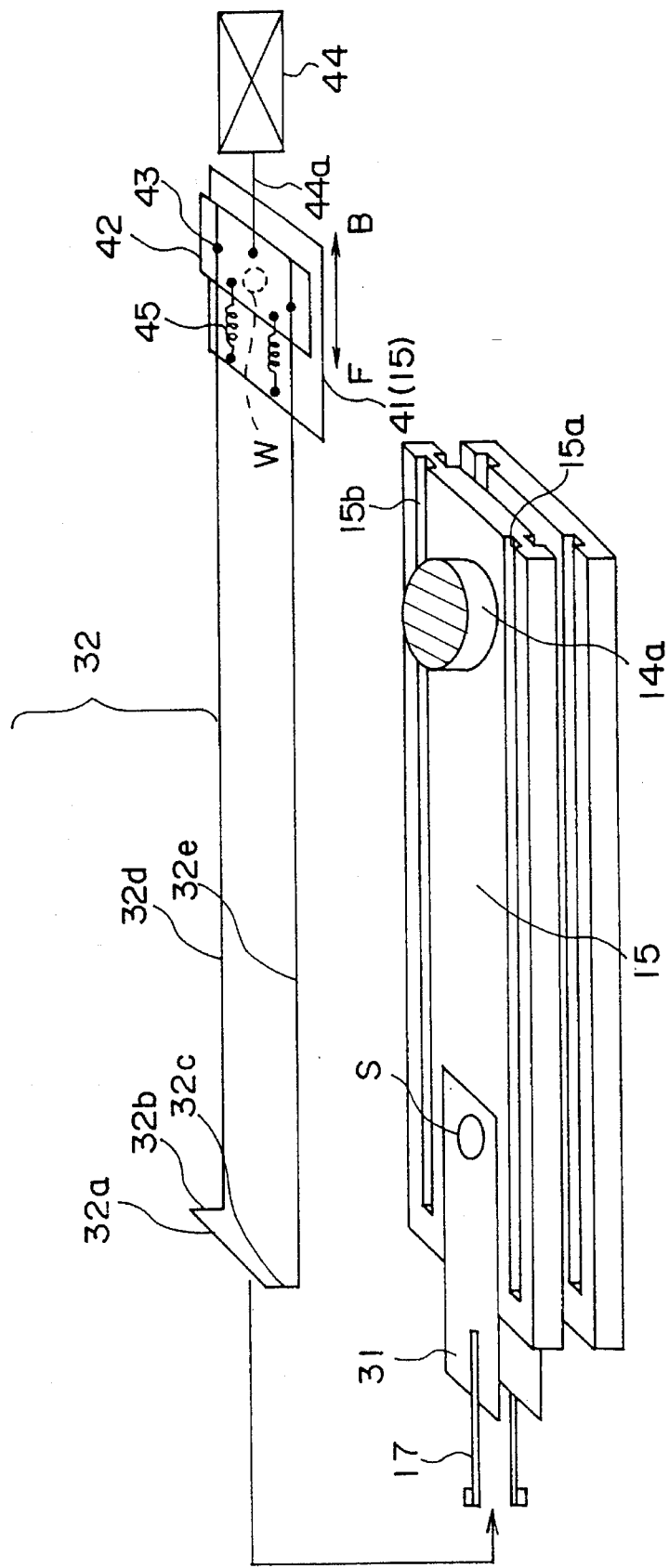
FIG. 9 is a diagram showing the adjusting mechanism according to a first embodiment of the present invention in an exploded view.

FIG. 9 shows the first embodiment of the present invention in more detail.

Referring to FIG. 9 showing the arm 15 connected to the rotary sleeve 14a, the arm 15 carries two leaf springs 31 on the upper and lower major surfaces thereof such that the leaf spring 31 is fixed upon the arm 15 at the spot S. Further, each leaf spring 31 carries thereon the elongated magnetic head member 17. In FIG. 9, two such arms 15 are shown wherein only the magnetic head members 17 connected to the upper arm 15 are illustrated.

Each of the arms 15 carries on the upper and lower major surfaces a pair of parallel grooves 15a and 15b, and the U-shaped wire 32 is accommodated in the grooves 15a and 15b in a manner slidable back and forth. The U-shaped wire 32 may be formed of a material such as stainless steel and has a diameter typically of 0.1 mm. As shown in FIG. 9, the wire 32 includes two parallel straight portions 32d and 32e that are connected with each other by a U-shaped bridging part 32a that includes two leg portions 32b and 32c connected respectively to the straight portions 32e and 32d, wherein the two straight portions 32d and 32e are accommodated in the grooves 15a and 15b. The leg portions 32b and 32c are bent generally at a right angle with respect to the straight portions 32d and 32e and the U-shaped bridging part 32a pushes the leaf spring in the upward direction or downward direction, depending on whether the wire 32 is provided on the upper major surface Or lower major surface of the arm 15. In the illustrated example, the leaf spring 31 extends in the same direction as the elongated direction of the arm 15 without the wire member 32 mounted on the arm 15.

Further, the straight portions 32d and 32e have respective free ends fixed on a slider 42 that in turn is mounted slidable on a member 41 that forms a part of the arm 15, and the slider 42 is connected to a solenoid actuator 44 by a mechanical means such as a wire 44a. The slider 42 is connected to the straight portions 32d and 32e at spot 43. The wire 44a is engaged to the slider 42 in a manner detachable by a mechanism such as hook so that the wire 44a can be disconnected after optimization of the contact angle described below. Further, the slider 42 is urged in the forward direction by resilient means such as a spring 45. Thereby, the solenoid 44 exerts a force in the direction opposite to the spring 45 and the slider moves back and forth in response to the energization of the solenoid as indicated by the arrows B and F.

Figure 10:
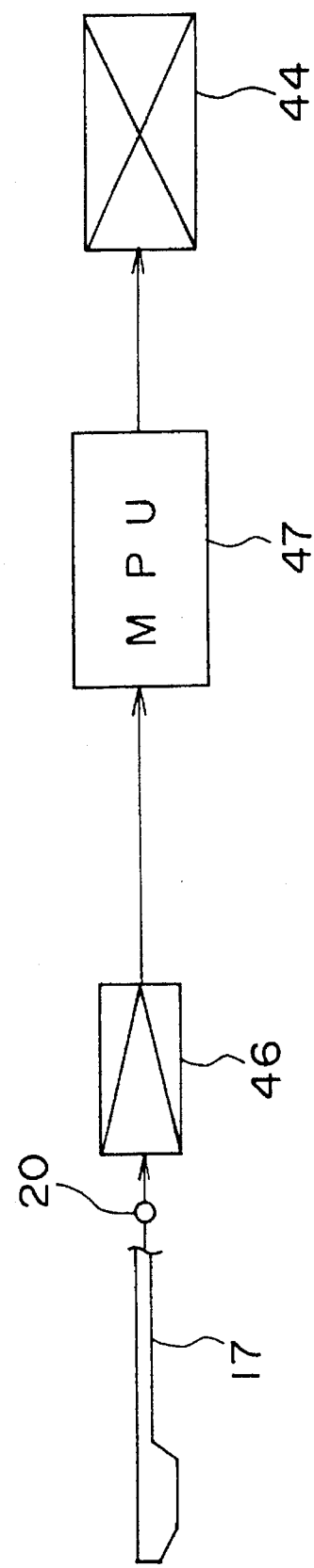
FIG. 10 is a block diagram showing a feedback adjustment for optimization of the contact angle achieved by the present invention.

FIG. 10 shows the block diagram of a feedback control circuit that is used for energizing the solenoid 44 for the optimization of the magnetic head member 17.

Referring to FIG. 10, the circuit is used typically when shipping the hard disk device or when repairing the device, and includes an analog amplifier 46 connected to the terminal pad 20 of the hard disk device for amplifying a signal picked up from the magnetic disk 13 by the elongated magnetic head 17. The signal amplified at the amplifier 46 is supplied to a microprocessor 47 for detecting a maximum intensity of the reproduced signal. Further, the microprocessor 47 produces a control signal to the solenoid 44 for controlling the energization of the solenoid 44 such that the intensity of the reproduced signal is maximized.

Figure 11:
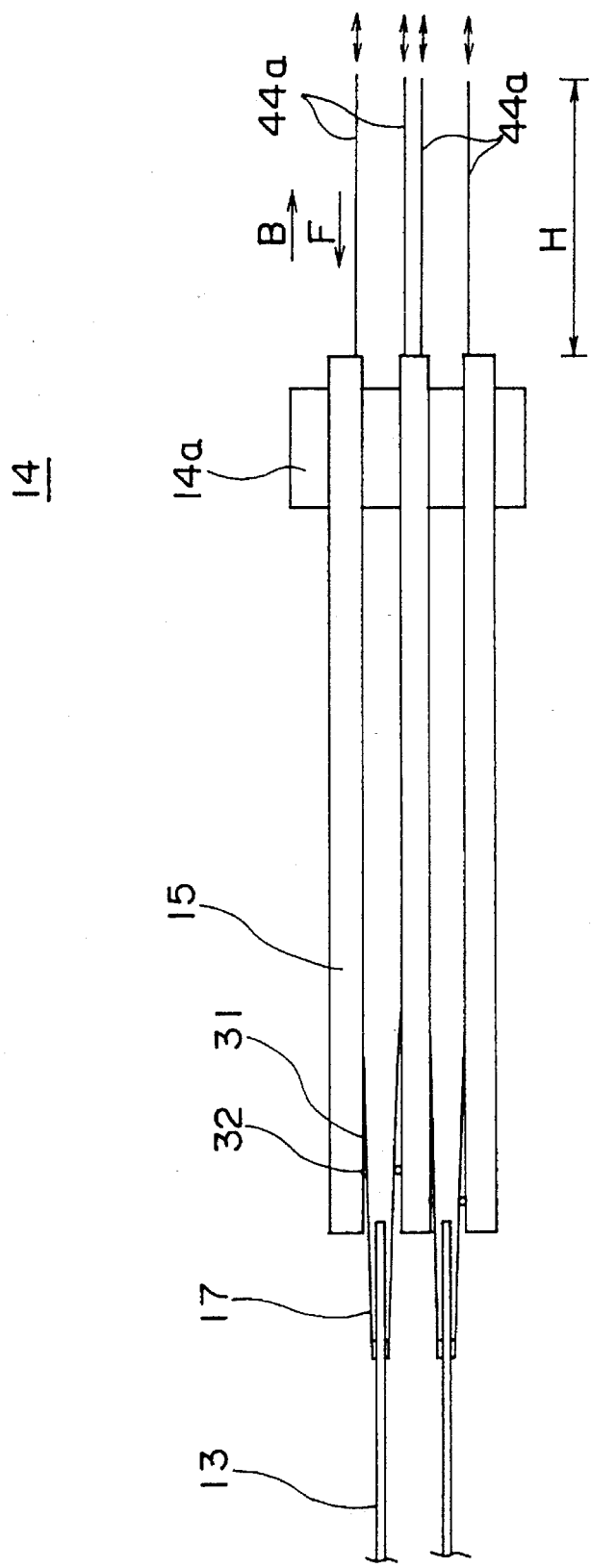
FIG. 11 is a diagram showing the adjustment of the contact angle of the magnetic head according to the first embodiment.

FIG. 11 shows the adjustment of the wire 32, wherein the amplifier 46 is connected to the terminal pad 20 as described with reference to FIG. 10 and each of the wires 32 is moved back and forth individually by connecting the wire 44a to the corresponding slider 42. Once the optimum position of the wire 32 is found out, the slider 42 is fixed upon the member 41 that may be a part of the arm 15 as mentioned previously by adhesive or welding at a region schematically shown in FIG. 9 by W, and a portion H of the wire 44a is disconnected by releasing the engagement at the hook 44a. The foregoing adjustment is achieved to each of the arms 15 extending from the sleeve 14a.

Figure 1:
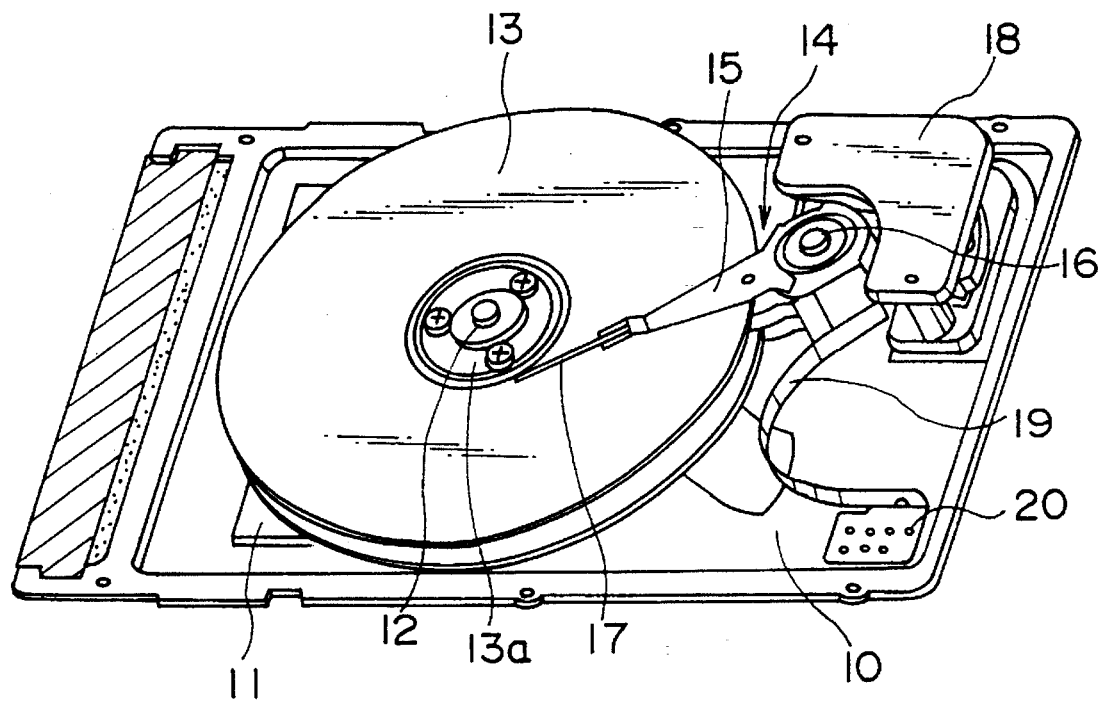
FIG. 1 is a diagram showing a conventional hard disk device having an elongated magnetic head that establishes a contact engagement with a disk surface, in a perspective view.
Figure 2:
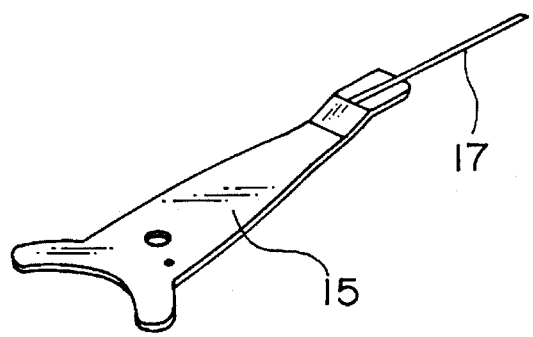
FIG. 2 is a diagram showing a swing arm used in the hard disk device of FIG. 1 for carrying the elongated magnetic head.
Figure 3:
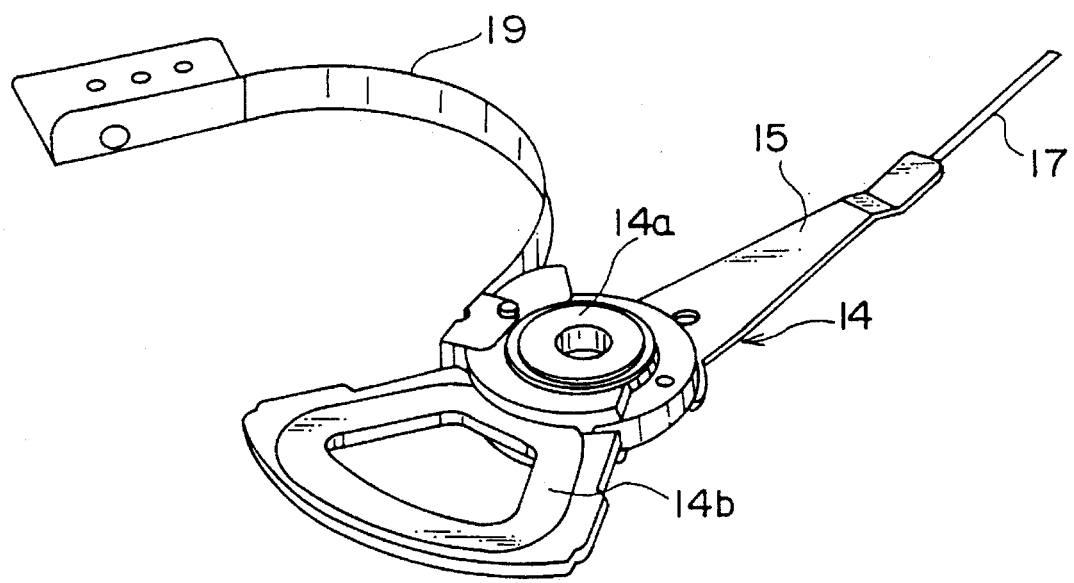
FIG. 3 is a diagram showing an arm assembly that includes a bearing part and an actuation coil.
Figure 4:
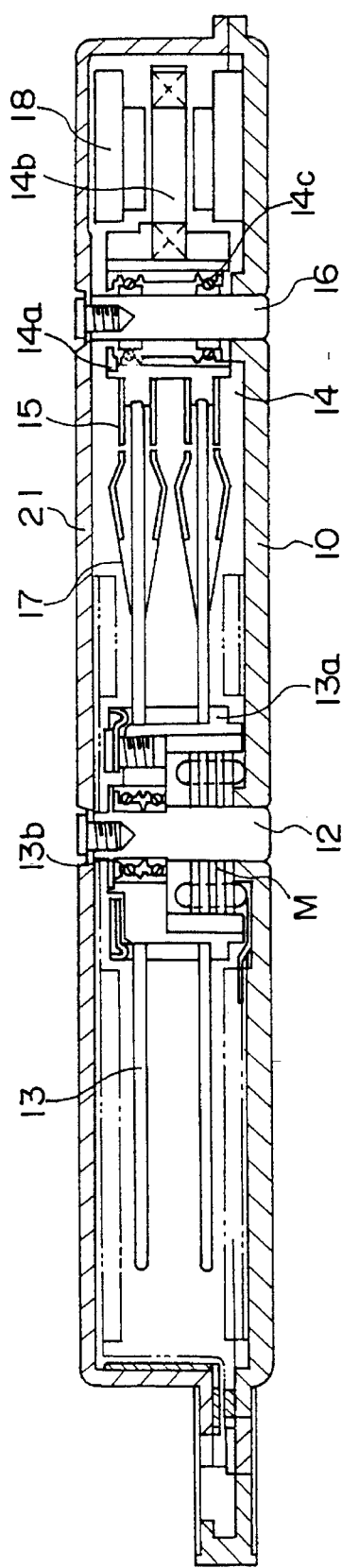
FIG. 4 is a diagram showing the hard disk device of FIG. 1 in a cross sectional view.
Figure 5:
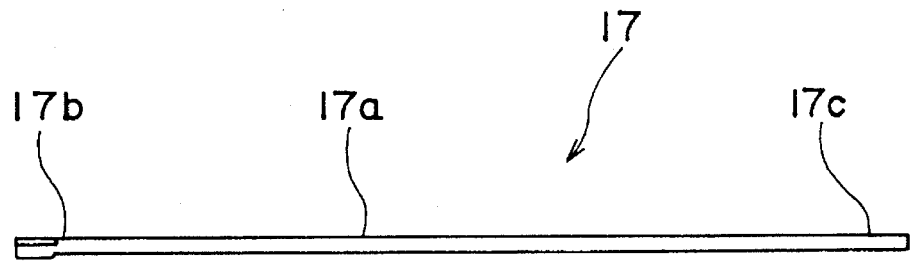
FIG. 5 is a diagram showing the magnetic head member used in the hard disk device in an enlarged scale.
Figure 6:
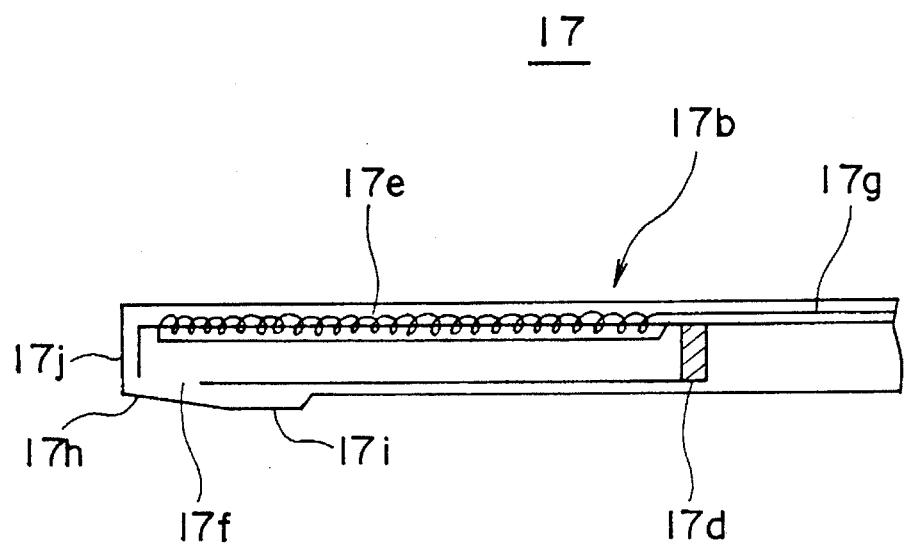
FIG. 6 is a diagram showing the internal structure of the magnetic head of FIG. 5 in an enlarged cross sectional view.
Figure 7:
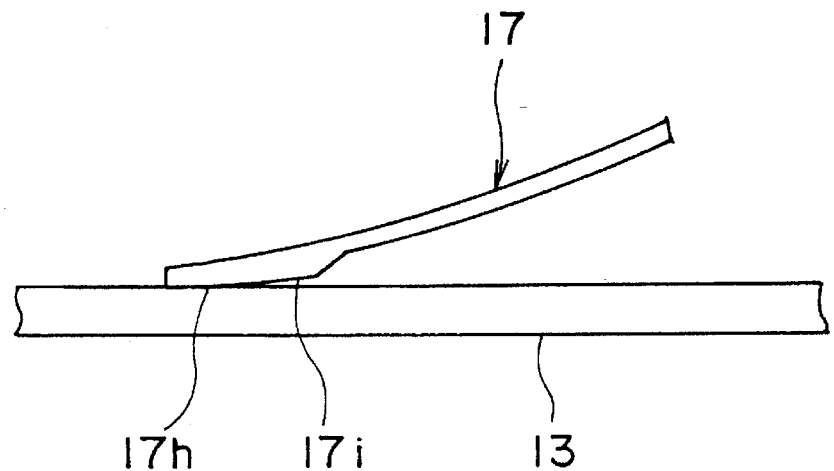
FIGS. 7(A) and 7(B) are diagrams showing the state of contact between the magnetic head and the magnetic disk respectively for a normal state and an abnormal state.
Figure 7:
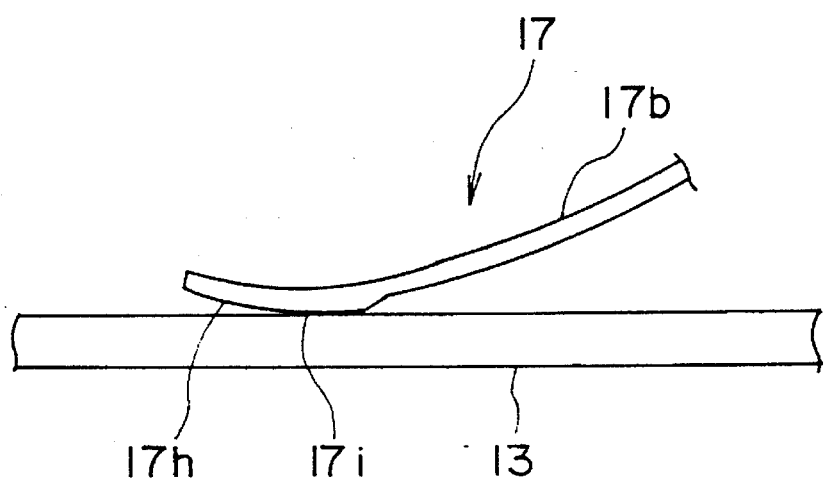

With the foregoing adjustment of the wire 32, the contact angle of the magnetic head member 17 to the disk surface of the magnetic disk 13 is optimized such that the slide surface 17h of the head member 17 contacts with the disk surface properly as shown in FIG. 7(A).

Figure 12:
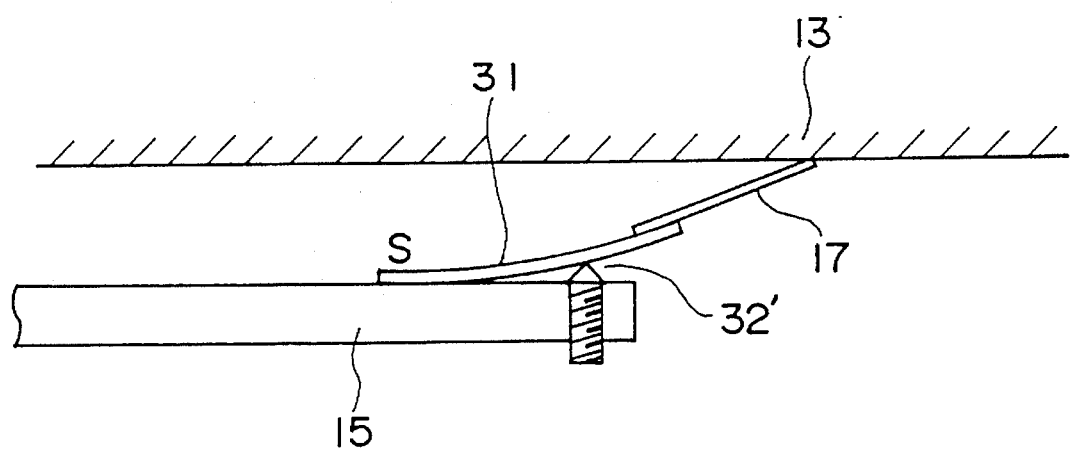
FIG. 12 is a diagram showing a second embodiment of the present invention.

FIG. 12 shows a second embodiment of the present invention, wherein the wire member 32 is replaced by a screw 32' that is threaded into the arm 15 in correspondence to the tip end thereof for urging the leaf spring 31 to bend toward the disk 31. By adjusting the screw, the same effect as the first embodiment can be achieved.

It should be noted that the means for adjusting the contact angle of the elongating magnetic head is by no means limited to the wire member 32 of the first embodiment. Further, the actuation of the wire member 32 is not limited to the solenoid control mechanism as shown in the first embodiment but a manual adjustment may also be used.

Further, the present invention is not limited to the embodiments described heretofore, but various variations and modifications may be made without departing from the scope of the invention.

What is claimed is:

1. A magnetic information storage device, comprising:

a base body;

at least one magnetic disk held rotatably on said base body, said magnetic disk being formed of a rigid material and carrying thereon a magnetic coating;

driving means for driving said magnetic disk to cause a revolving motion thereof;

swing arm means held rotatably on said base body such that said arm means scans a surface of said magnetic disk generally in a radial direction of said magnetic disk, in response to a swinging motion of said arm means;

actuation means for actuating said swing arm means for causing said swinging motion in said swing arm means;

magnetic head means fixed at a free end of said swing arm means for scanning said surface of said magnetic disk generally in the radial direction in response to said swinging motion of said swing arm means, said magnetic head means having an elongated form extending between a first end and a second end at which said magnetic head means is connected to said swing arm means, said magnetic head means establishing a continuous contact engagement with said surface of said magnetic disk during obtainment of electromagnetic signals by said magnetic head means from said surface of said magnetic disk, said magnetic head means carrying an electromagnetic conversion element in correspondence to said first end for establishing an electromagnetic interaction with said magnetic disk in order to obtain said electromagnetic signals; and adjustment means provided on said swing arm means for adjusting a contact angle between said magnetic head means and said surface of said magnetic disk such that a reproduced signal is obtained at said electromagnetic conversion element in response to a magnetic recording on said magnetic disk, with a maximized signal amplitude obtained as a direct consequence of said adjusting.

2. A magnetic information storage device as claimed in claim 1, wherein said magnetic head means comprises: a magnetic head body having an elongated form and a support member for carrying said elongated magnetic head body thereon, said support member being connected in the vicinity of said free end of said swing arm means; said adjustment means comprising: an engaging member provided between said swing arm means and said support member for establishing a mechanical engagement with both of said adjustment means and said swing arm means, said engaging member causing a change in said contact angle in response to a relative position thereof with respect to said swing arm means; moving means for moving said engaging member with respect to said swing arm means in a radial direction of said swing arm means with respect to an axis of said swinging motion; and fastening means for fixing said moving means on said swing arm means such that said contact angle is set to an optimum angle that provides said reproduced signal with the maximized signal amplitude.

3. A magnetic information storage device as claimed in claim 2, wherein said engaging member comprises a wire member having a generally U-shaped form, said wire member comprising a pair of straight portions extending parallel with each other and a bridging part formed to connect said straight portions; said moving means comprising a pair of grooves provided in said swing arm means to extend parallel with each other in said radial direction of said swing arm means for accommodating said straight portions of said wire member such that said bridging part of said wire member establishes the mechanical engagement with said support member and said arm means, and a slidable member holding said pair of straight portions of said wire member and provided slidably with respect to said swing arm means; and wherein said fastening means comprises a region provided in said slidable member for fixing said slidable member against said swing arm means.

4. A magnetic information storage device as claimed in claim 3, wherein said moving means comprises urging means for urging said slidable member toward said free end of said swing arm means, said slidable member being further adapted for actuation by an external actuation mechanism such that said slidable member is urged in a direction opposite to said free end of said swing arm means.

5. A magnetic information storage device as claimed in claim 3, wherein said support member comprises a leaf spring mounted on said swing arm means in correspondence to said free end, and wherein said bridging part causes a resilient deformation of said leaf spring such that said magnetic head means establishes said contact engagement with said magnetic disk with said optimum angle.

6. A magnetic information storage device as claimed in claim 1, wherein said adjustment means comprises a screw threaded into said swing arm means for mechanical engagement with said magnetic head means such that said screw changes said contact angle in response to an actuation thereof.

7. A magnetic information storage device, comprising:

a base body;

at least one magnetic disk held rotatably on said base body, said magnetic disk being formed of a rigid material and carrying thereon a magnetic coating;

driving means for driving said magnetic disk to cause a revolving motion thereof;

swing arm means held rotatably on said base body such that said swing arm means scans a surface of said magnetic disk generally in a radial direction of said magnetic disk, in response to a swinging motion of said swing arm means;

actuation means for actuating said swing arm means for causing said swinging motion in said swing arm means;

magnetic head means fixed at a free end of said swing arm means for scanning said surface of said magnetic disk generally in the radial direction in response to said swinging motion of said swing arm means, said magnetic head means having an elongated form extending between a first end and a second end at which said magnetic head means is connected to said swing arm means, said magnetic head means establishing a contact engagement with said surface of said magnetic disk, said magnetic head means carrying an electromagnetic conversion element in correspondence to said first end for establishing an electromagnetic interaction with said magnetic disk;

adjustment means provided on said swing arm means for adjusting a contact angle between said magnetic head means and said surface of said magnetic disk such that a reproduced signal is obtained at said electromagnetic conversion element in response to a magnetic recording on said magnetic disk, with a maximized signal amplitude;

said magnetic head means further comprising a magnetic head body having an elongated form and a support member for carrying said magnetic head body thereon, said support member being connected in the vicinity of said free end of said swing arm means; said adjustment means comprising: an engagement member provided between said swing arm means and said support member for establishing a mechanical engagement with both of said adjustment means and said swing arm means, said engagement member causing a change in said contact angle in response to a relative position thereof with respect to said swing arm means; moving means for moving said engagement member with respect to said swing arm means in a radial direction of said swing arm means with respect to an axis of said swinging motion; and fastening means for fixing said moving means on said swing arm means such that said contact angle is set to an optimum angle that provides said reproduced signal with the maximized signal amplitude; and said engagement member further comprising a wire member having a generally U-shaped form, said wire member comprising a pair of straight portions extending parallel with each other and a bridging part formed to connect said straight portions; said moving means comprising a pair of grooves provided in said swing arm means to extend parallel with each other in said radial direction of said swing arm means for accommodating said straight portions of said wire member such that said bridging part of said wire member establishes the mechanical engagement with said support member and said swing arm means, and a slidable member holding said pair of straight portions of said wire member and provided slidably with respect to said swing arm means; and wherein said fastening means comprises a region provided in said slidable member for fixing said slidable member against said swing arm means.

8. A magnetic information storage device as claimed in claim 7, wherein said moving means comprises urging means for urging said slidable member toward said free end of said swing arm means, said slidable member being further adapted for actuation by an external actuation mechanism such that said slidable member is urged in a direction opposite to said free end of said swing arm means.

9. A magnetic information storage device as claimed in claim 7, wherein said support member comprises a leaf spring mounted on said swing arm means in correspondence to said free end, and wherein said bridging part causes a resilient deformation of said leaf spring such that said magnetic head means establishes said contact engagement with said magnetic disk with said optimum angle.

* * * * *